Feb. 24, 1970 K. N. SCOTT 3,496,663

INFORMATION SUPPORTING PANEL FOR VISIBLE RECORDS

Filed June 2, 1967 3 Sheets-Sheet 1

INVENTOR.
KENNETH N. SCOTT,
BY
Berman, Davidson & Berman
ATTORNEYS.

Feb. 24, 1970 K. N. SCOTT 3,496,663

INFORMATION SUPPORTING PANEL FOR VISIBLE RECORDS

Filed June 2, 1967 3 Sheets-Sheet 2

INVENTOR.
KENNETH N. SCOTT,
BY Berman, Davidson & Berman
ATTORNEYS.

Feb. 24, 1970 K. N. SCOTT 3,496,663

INFORMATION SUPPORTING PANEL FOR VISIBLE RECORDS

Filed June 2, 1967 3 Sheets-Sheet 3

INVENTOR.
KENNETH N. SCOTT,

BY Berman, Davidson & Berman

ATTORNEYS.

United States Patent Office 3,496,663

Patented Feb. 24, 1970

3,496,663

INFORMATION SUPPORTING PANEL FOR VISIBLE RECORDS

Kenneth N. Scott, Box 213, Toyah, Tex. 79785

Filed June 2, 1967, Ser. No. 646,417

Int. Cl. G09f *15/00*

U.S. Cl. 40—63 9 Claims

ABSTRACT OF THE DISCLOSURE

A visible records supporting panel consisting of a generally rectangular rigid frame having inwardly-facing side grooves or channels slidably-receiving the ends of articulated horizontal record strips. The record strips are detachably-interlocked at their longitudinal margins and can be disengaged by sliding them longitudinally relative to each other. This is ordinarily prohibited by their engagement in the side grooves of the frame. However, the rear walls of the side grooves are notched at spaced intervals to allow the adjacent articulated strips to be displaced from the plane of the side grooves sufficiently to allow designated record strips to be translated longitudinally for removal and/or replacement of record strips. The record strips, themselves, may consist of interlocking longitudinally-aligned segments.

This invention relates to panels for visible record strips, and more particularly to an improved record strip supporting panel for use in bookkeeping systems.

A main object of the invention is to provide a novel and improved visible record supporting panel which is relatively simple in construction, which is compact in size, which is easy to store, and which is structurally-arranged so that the record strips mounted therein may be easily removed and/or replaced, as desired.

A further object of the invention is to provide an improved visible record supporting panel especially useful in bookkeeping systems, the panel including means for supporting a row of information strips in consecutive order and being so arranged that the strips may be easily removed and/or replaced, the panel involving a minimum number of parts, being sturdy in construction, being neat in appearance, and supporting the information strips in a flush configuration so that the panel may be easily photographed or reproduced on conventional photocopying equipment.

A still further object of the invention is to provide an improved visible record supporting panel of the type employing a rectangular frame containing consecutive information-carrying strips, the strips being detachably articulated at their longitudinal margins and the panel being arranged so that the strips can be readily disconnected from each other and/or replaced by other strips, either of similar configuration, or consisting of longitudinally-aligned interlocked segments such that parts of the horizontally-arranged information can be readily changed, if so desired.

Further objects and advantages of the invention will become apparent from the following description and claims, and from the accompanying drawings, wherein:

Figures 1, 2:
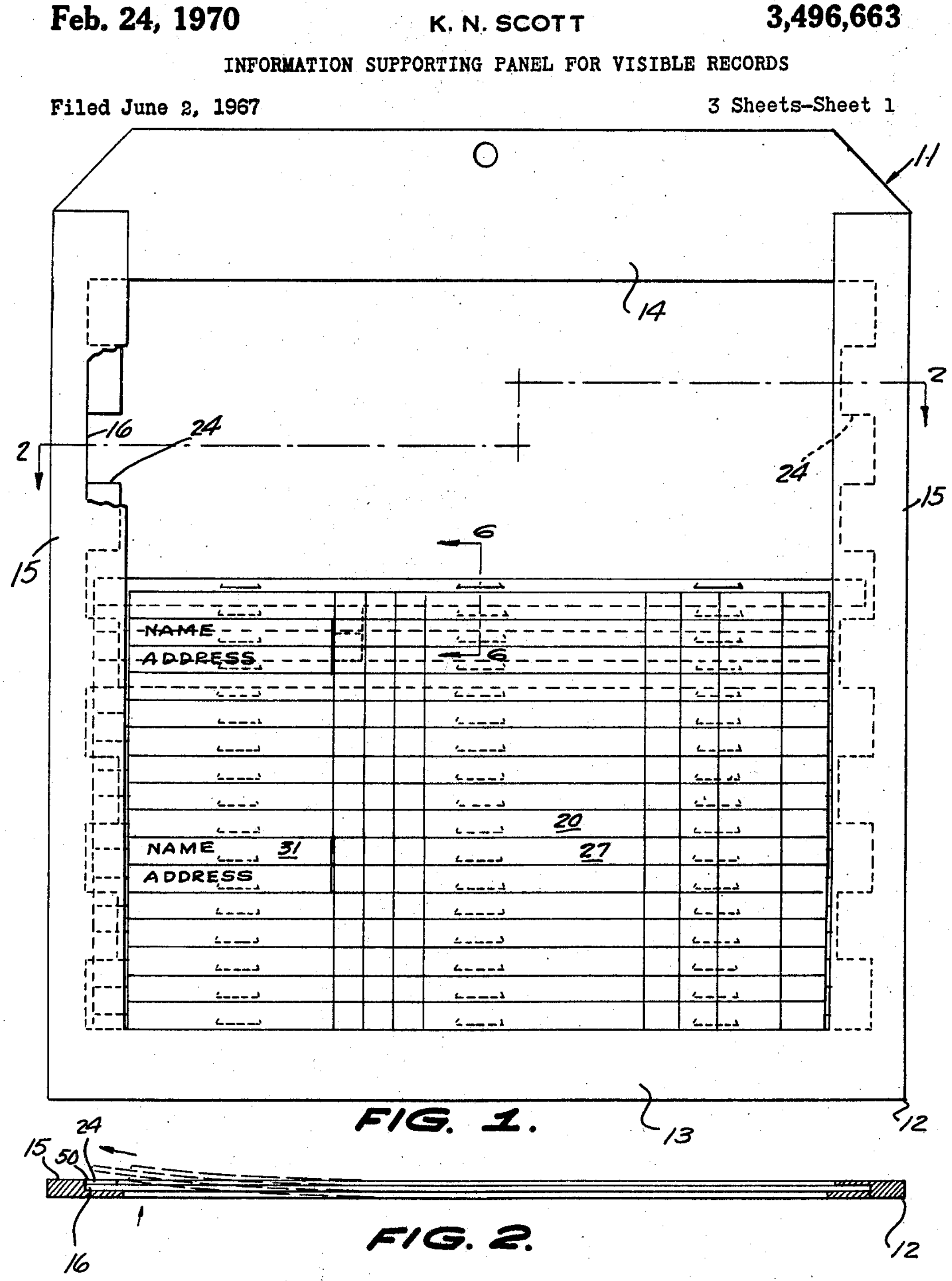
FIGURE 1 is a front elevational view, with a part broken away, of an improved visible record supporting panel assembly constructed in accordance with the present invention, shown partly loaded with record strips.
FIGURE 2 is a horizontal cross-sectional view taken substantially on the line 2—2 of FIGURE 1.

Referring to the drawings, 11 generally designates a typical visible record supporting panel assembly constructed in accordance with the present invention. The assembly 11 comprises a generally rectangular rigid frame 12 which is relatively flat and which comprises a transverse bottom portion 13, a transverse top portion 14, and respective side legs 15, 15, the arms 13, 14 and the legs 15, 15 being integrally-united. The side legs 15, 15 are formed with inwardly-facing grooves or channels 16 adapted to slidably-receive the end portions of articulated horizontal record strips in a manner presently to be described.

Figures 3, 4, 5, 6, 7:
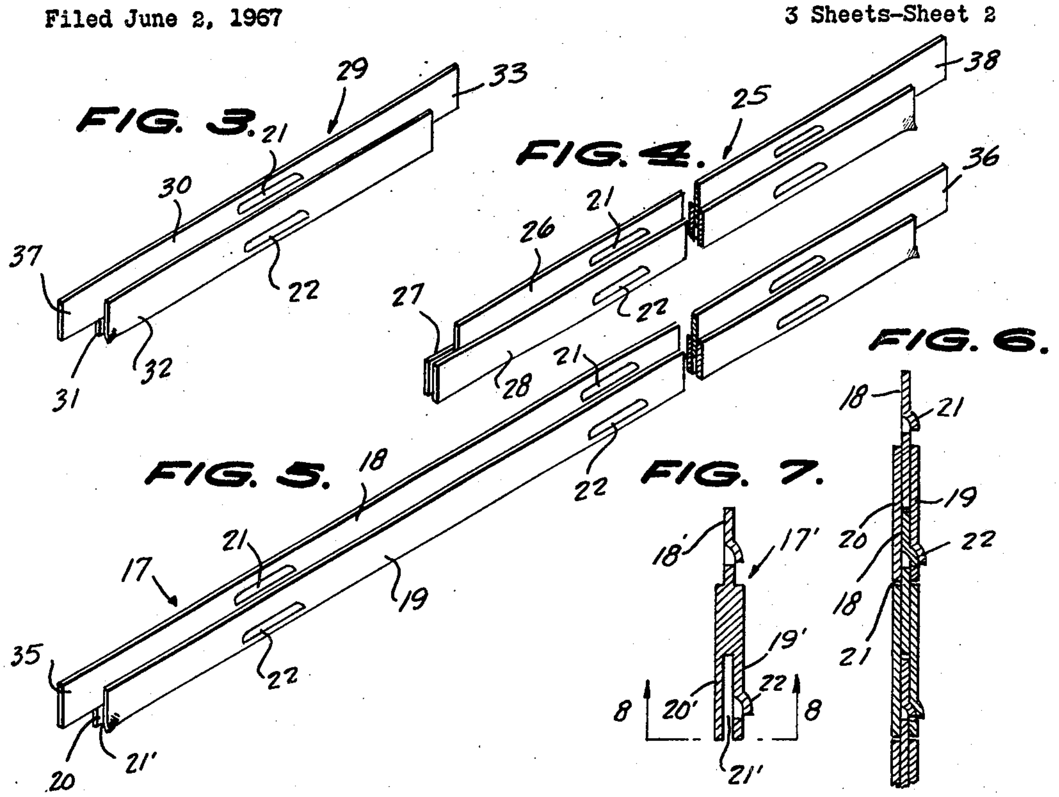
FIGURE 3 is a perspective view of a strip segment, as employed in the assembly of FIGURE 1.
FIGURE 4 is a perspective view, partly broken away, of another segment adapted to interlock longitudinally with the strip segment of FIGURE 3.
FIGURE 5 is a perspective view, partly broken away, of a unitary information strip employed in the visible record supporting panel assembly of FIGURE 1.
FIGURE 6 is an enlarged transverse vertical cross-sectional view taken substantially on the line 6—6 of FIGURE 1.
FIGURE 7 is a transverse vertical cross-sectional view taken through one of the record strips employed in the assembly, but illustrating a modified construction thereof.

FIGURE 5 illustrates a typical one-piece record strip, designated generally at 17. The one-piece record strip 17 comprises a longitudinally-extending tongue strip 18 to which is rigidly-secured a pair of parallel depending, longitudinally-extending wall strips 19, 20, the strips 19 and 20 being secured to opposite sides of the lower portion of the tongue strip 18 and depending therefrom to define a channel 21' adapted to receive the tongue portion 18 of a subjacent record strip in the manner illustrated in FIGURE 6. The tongue strips 18 are formed with longitudinally-spaced, outwardly-struck longitudinal locking lugs 21, and the rear wall strips 19 are formed with similarly spaced and similarly shaped outwardly-struck portions 22 defining apertures adapted to detachably interlock with the lugs 21 of the subjacent strips. This is shown in FIGURE 6 wherein it will be seen that the lugs 21 engage in the recesses defined by the outwardly-struck lugs 22 to detachably-interlock a pair of adjacent strips together so that the strips are connected so as to be articulated relative to each other. The wall members 20 and 19 are relatively flexible so that a pair of adjacent strips may angle relative to each other while being interlocked.

The rear walls of the channels defined by the grooves 16 are formed with rectangular notches 24 of substantial width and at regularly-spaced intervals, as shown in FIGURE 1, the width of the notches 24 being substantially greater than the strips 17.

The record strips may be either of the one-piece type, as shown at 17 in FIGURE 5, or may be of the segment type illustrated in FIGURES 3 and 4. In the case of the record strips 17, a set of data is inscribed on the complete strip and in order to change the data, the entire strip must be replaced. In the case of the segmented arrangement illustrated in FIGURES 3 and 4, separate portions of the data can be replaced. Thus, the segmented strips may comprise a first section 25, shown in FIGURE 4, comprising a tongue element 26 and depending side pieces 27 and 28, the tongue element 26 being provided with outwardly-struck lugs 21 and the depending element 28 being provided with outwardly-struck lug elements 22 corresponding to the outwardly-struck elements of the one-piece strip 17. The strip 25 is adapted to longitudinally-interlock with another segment 29 which is relatively short, but which is otherwise similar in construction, having a tongue element 30 and depending side wall elements 31 and 32. The tongue element 30 has an outwardly-struck locking lug 21 and the depending longitudinal wall element 32 has an outwardly-struck locking lug 22. The tongue element 30 has a projecting end portion 33 adapted to be received between the laterally-projecting end portions of the parallel elements 27 and 28 of the strip segment 25 so as to provide interlocking engagement of the segments 29 and 25. Thus, as shown in FIGURE 3, the right-end portion of tongue element 30 projects outwardly relative to the ends of the depending wall elements 31 and 32 and the left-end of the tongue element 26 of segment 25 is spaced inwardly from the left ends of the elements 27 and 28 by a corresponding length. When the segments 29 and 25 are interlocked in longitudinal alignment with each other, their total length is substantially equal to that of the one-piece information strip 17. Also, the locking lugs 21, 22 of the composite strip are spaced in the same manner as those of the one-piece strip 17. The use of the longitudinal interlocking segments 29 and 25 permits parts of the data to be changed, for example, names or addresses may be changed individually, as required.

The right and left ends of the tongue elements 18 of the one-piece strips 17 project outwardly relative to the ends of the depending wall portions 20 and 21, as shown at 35 and 36 in FIGURE 5, to permit said end portions 35 and 36 to be received in the grooves. The wall thicknesses of the grooves 16 are substantially the same as the the thicknesses of the depending portions 20 and 21 of the strips 17 so that when the strips are inserted in the manner illustrated in FIGURE 1, the resultant assembly provides a flush front surface. In the case of the multiple segment composite strips, for example, the composite strips defined by the joining of segments 29 and 25, the same result is obtained, the left-end portion of the tongue element 30, shown at 37, and the right-end portion of the tongue element 26, shown at 38, performing the same functions as the tongue projections 35 and 36 of the one-piece strip 17.

The notches 24 provide clearance for the projections at the ends of the information strips, allowing th strips to be inserted in the frame 12. Thus, the strips may be successively inserted in the frame until they completely fill same. This may be done by engaging one strip after another in the frame with its tongue-end projections received in the grooves 16 and with the successive strip members resiliently interlocked by the interlocking engagement of their lugs 21 with the recesses defined by their outwardly-struck mating lug elements 22, as above-described. Thus, a strip may be pushed down onto the tongue element 18 of the subjacent strip and its flexible wall portion 19 will resiliently-yield to allow the lug elements 21 of the subjacent strip to lockingly-engage in the recesses defined by the outwardly-struck lugs 22 of the strip being inserted.

In certain instances it is desired to remove an information strip entirely, or to replace it by another information strip. The provision of the notches 24 allows this to be done without requiring removal of all the other strips in the total assembly since removal of a particular strip may be accomplished by sliding it longitudinally relative to its adjacent strips. Thus, the strip to be removed may be pushed rearwardly sufficiently to allow such sliding movement thereof so as to unlock it from the adjacent strips. As above-explained, the depending elements 20 and 21 (or 27, 28 and 31, 32) are sufficiently flexible to allow a substantial amount of relative angling of the strips. The strip to be removed may thus be pushed rearwardly through a notch 24 sufficiently to allow it to be moved longitudinally and to thereby disengage it from the upper and lower adjacent strips. FIGURE 2 illustrates, in dotted view, the manner in which a strip may be deflected so as to shift it rearwardly a sufficient amount to allow it to be slid longitudinally to disengage it from the upper and lower adjacent strips.

The strips 17, and also the composite strips defined by the interengagement of the segments 29, 25, are sufficiently flexible longitudinally to permit the required deflection indicated in dotted view in FIGURE 2.

From the above description it will be apparent that the record data in the form of strips of data-carrying material, such as names, addresses or other pertinent data to be tabulated can be assembled in frames 12 in the desired sequence, for example, alphabetically, chronologically, or in any other desired sequence, and that systematic arrangement can be maintained in spite of required changes in data, without the necessity of completely removing all the data strips from the frames whenever such changes are required. Individual strips or even segments thereof may be removed and replaced as required without disarranging the intended sequence. In circumstances where some strips may be removed in order to provide access to other strips, only a small number of such strips need be disturbed, since the notches 24 are relatively closely-spaced, for example, may be spaced apart by distances corresponding to the width of two strips, or less, and a large number of such uniformly-spaced notches may be provided. In a typical arrangement illustrated, the notches 24 have widths approximately equal to the widths of two strips and are spaced apart by a similar distance. The notches 24, at the opposite sides of the frame, are, of course, in alignment with each other.

Figure 8:
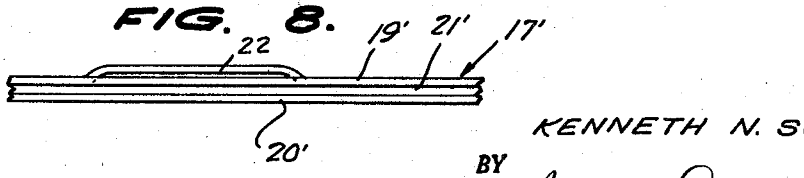
FIGURE 8 is a fragmentary bottom plan view taken substantially on the line 8—8 of FIGURE 7.

In the modification illustrated in FIGURES 7 and 8, the strips, shown at 17′ are of unitary construction with the tongue elements 18′ thereof integral with the front and rear depending wall elements 20′ and 19′ thereof. In the first-described embodiment, the front and rear depending wall elements 20 and 19 are secured to the tongue elements 18 in any desired manner, such as by welding, cementing, or the like.

The strips may be made of any desired material, such as sheet metal, plastic, or the like.

Figure 10:
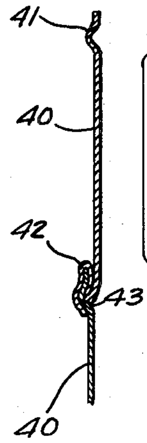
FIGURE 10 is a fragmentary transverse vertical cross-sectional view taken through portions of a pair of adjacent record strips similar to that illustrated in FIGURE 9 and showing how the adjacent strips are interlocked.
Figure 9:
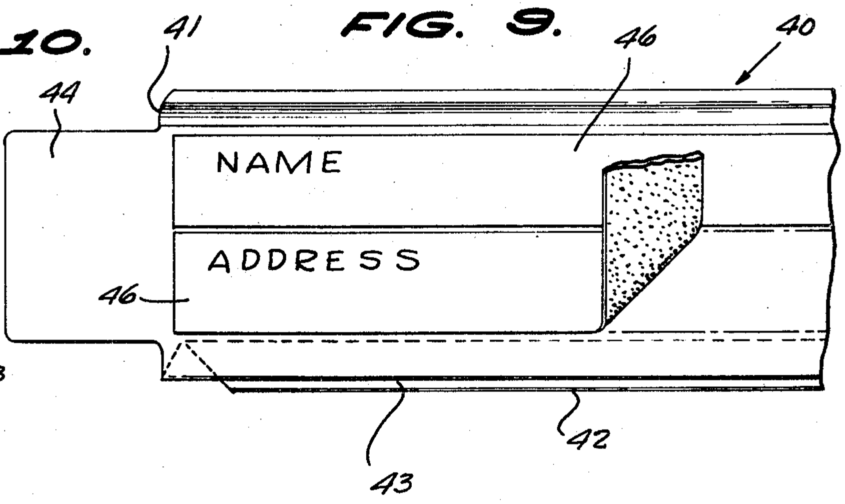
FIGURE 9 is an enlarged fragmentary front elevational view of one end portion of a further modification of a record strip which may be employed in a visible record supporting panel assembly according to the present invention.

In the modification illustration in FIGURES 9 and 10, a further modified strip, designated generally at 40, is shown. Strip 40 comprises suitable sheet material, such as sheet metal, or the like, elongated in shape and formed with a longitudinal forwardly-facing channel-shaped corrugation 41 at its top margin and formed at its bottom margin with a correspondingly-shaped rearwardly-deflected crimp 42. The crimp 42 is in the form of a longitudinal sleeve shaped to closely receive the channel-shaped upstanding tongue element 41 of a subjacent strip with the sleeve opening at the bottom edge of the strip, as shown at 43 to define a receiving passage for the subjacent channel-shaped tongue element. An articulated connection is defined between a pair of adjacent strips, since a substantial amount of angling can take place therebetween, sufficient to allow strips to be deflected rearwardly through notches 24 in the manner above-described, whereby to permit individual strips to be removed or replaced by sliding them longitudinally so as to disengage them from the adjacent strips in the series. The one-piece members 40 are provided with laterally-projecting end portions 44 which can pass through the notches 24. The information can be mounted on the strips 40 in any desired manner, for example, can be carried on lengths of pressure-sensitive adhesive tape 46 adhesively-mounted on the front faces of the strips 40. The information may be suitably segmented, for example, may comprise separate strips carrying names and addresses so that if so desired, portions of the information can be removed and replaced. In the typical example illustrated in FIGURE 9, the address is on one piece of tape 46 and the corresponding name is on another. Thus, if there is a change of address, the lower piece of tape 46 can be removed and replaced by another piece of tape carrying the new or corrected address.

In the various forms of the invention thus far shown and described herein, since the data strips are interlocked to form a unitary assembly, the complete strip assembly can be removed or replaced vertically through any of the upper or lower end pairs of opposing notches 24, 24, whereby to provide easy access to the strip assembly for removing or changing plates or for inserting additional plates.

As above-mentioned, in the various forms of the assembly, the composite frame has a substantially flush front surface on which the indicia or information appears, so that the assembly is especially suitable for photocopying. In many types of copying machines, it is necessary that the front or copying surface be relatively flat and smooth. The assembly 11 above-described substantially meets this requirement, whether using the strip constructions illustrated either in FIGURES 3 to 8, or in FIGURES 9 and 10.

As shown in FIGURE 2, the inner ends of the notches 24 may be provided with the bevels 50 to facilitate lateral sliding movement of strips to positions wherein they can be easily moved longitudinally for disengagement from their adjacent upper and lower strips.

In FIGURES 3, 4 and 5, the strips or strip segments are shown reversed, namely, when the strips or strip segments are mounted in the frame 12, the elements 19, 28 and 32 are at the rear of the assembly, whereas the elements 20, 27 and 31 are at the front of the assembly and carry the information.

Referring now to FIGURES 11 to 17, 50 generally designates another modification of an improved visible record-supporting panel assembly constructed in accordance with the present invention. The assembly 50 comprises a flat rectangular supporting sheet 51 which may be of metal, plastic, or any other suitable durable sheet material. Slidably-mounted on the supporting plate-like sheet 51 are a plurality of data strip members, generally indicated at 52. The plate 51 is not completely filled with these strips for a reason presently to be explained.

Figure 11:
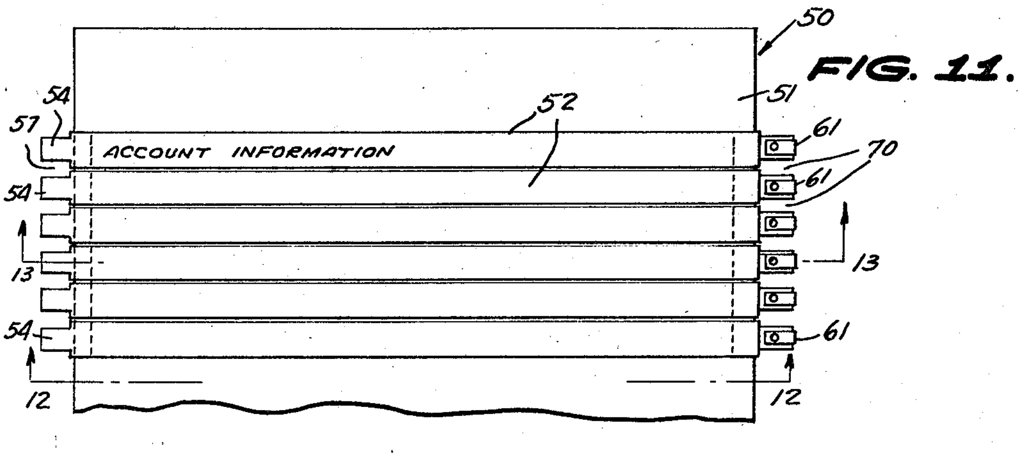
FIGURE 11 is a fragmentary top plan view of another modification of an improved visible record supporting panel assembly according to the present invention.
Figure 12:
FIGURE 12 is an edge elevational view of one of the record strips employed in the assembly of FIGURE 11, said view being taken substantially on the line 12—12 of FIGURE 11.
Figures 13, 14:
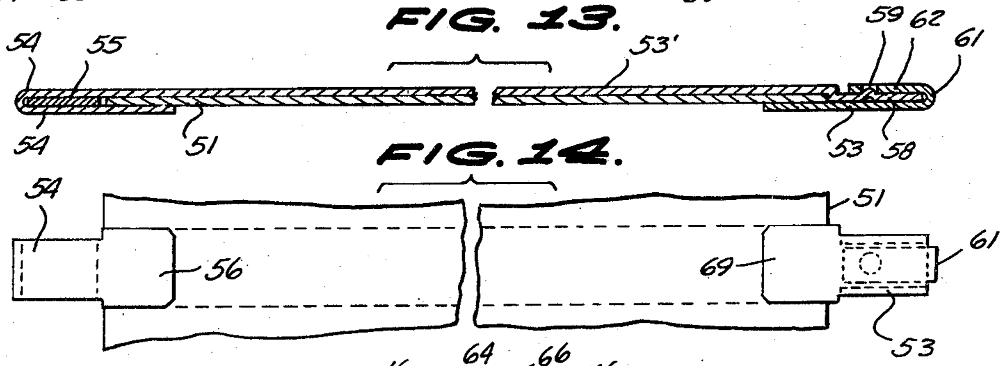
FIGURE 13 is an enlarged transverse vertical cross-sectional view taken substantially on the line 13—13 of FIGURE 11.
FIGURE 14 is an enlarged fragmentary bottom plan view of a portion of the assembly of FIGURE 11, showing the manner in which the ends of the record strips underlie the side marginal portions of the main panel of the assembly.

Each of the strip members 52 comprises an elongated flat body of suitable strip material, such as metal, plastic, or the like, shown at 53', formed at its left-end portion as viewed in FIGURE 11, with a reduced, reversely-bent and loop or tongue 54 of sufficient width to slidably-receive the left margin of plate member 51, as shown in FIGURE 13. A filler plate 55 is secured in the outer end portion of the loop 54, the filler element 55 having substantially the same thickness as main plate 51. As shown in FIGURE 14, the bottom underlying portion of each loop 54 is somewhat widened, as shown at 56. Due to the fact that the outer portions of the tongue members 54 are reduced, when the strips are placed adjacent to each other, notches 57 are defined between adjacent tongues 54, 54, as shown in FIGURE 11.

Figures 15, 17:
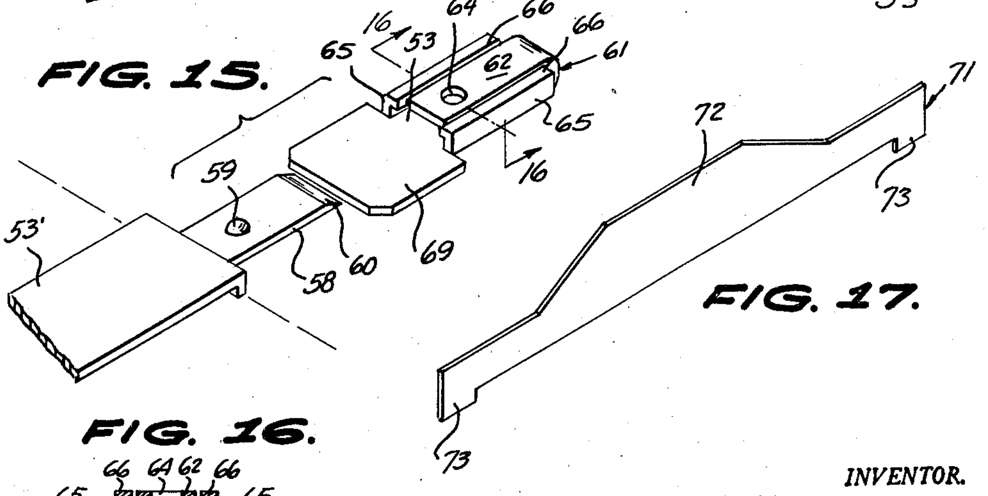
FIGURE 15 is an enlarged perspective view of the end portion of one of the information strips of FIGURES 11 to 14 with its associated retaining clip shown spaced from the cooperating tongue element of the information strip.
FIGURE 17 is a perspective view of a strip-shifting implement for use with the record-supporting panel assembly of FIGURE 11.
Figure 16:
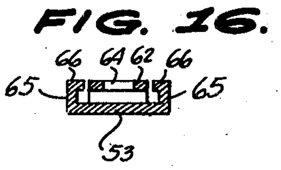
FIGURE 16 is a transverse vertical cross-sectional view taken substantially on the line 16—16 of FIGURE 15.

The opposite ends of the strip bodies 53' are formed with downwardly-offset reduced tongue portions 58, said tongue portions 58 being downwardly-offset substantially by the thickness of the main plate 51, so that the tongue elements 58 will be substantially coplanar with the main plate 51 when assembled thereon, as shown in FIGURE 13. Each tongue 58 is formed with an upwardly-deformed detent lug 59. The outer end edges of the tongues are beveled, as shown at 60. Lockingly-engageable with the tongues 58 are respective retaining clips 61 which are generally U-shaped and which have the top arms 62 and the bottom arms 53, spaced apart so as to closely-receive the tongue elements 58 therebetween. Each top arm 62 is formed with an aperture 64 lockingly-engageable with a detent element 59, the top arms 62 being sufficiently yieldable to allow the clip member 61 to be slidably-engaged on the tongues 58 and to be pushed inwardly to allow arm 62 to flex upwardly until the lugs 59 snap into the apertures 64. The side edges of the outer portions of bottom arms 53 are formed with upstanding flanges 65, 65 having inturned top portions 66, defining guideways to slidably-receive the opposite longitudinal edge portions of tongues 58, whereby top arm 62 and the flanges 65, 65 define a socket for an associated tongue element 58. As shown in FIGURE 15, the inner end portions of the bottom arms 53 are somewhat widened, as shown at 69. When the clips 61 are lockingly-engaged on the tongues 58 in the manner shown in FIGURES 11, 13 and 14, the associated strips 52 are slidably-secured to the main supporting plate 51, and when the strips 52 are arranged adjacent to each other, as shown in FIGURE 11, notches 70 are defined between adjacent clips 61, the notches 70 being similar to the opposite notches 57.

A strip 52 may be removed by disengaging its retaining clip 61 from its tongue portion 58, whereby the strip may be rotated upwardly sufficiently to allow it to be slid laterally, namely, to the left, as viewed in FIGURE 13, sufficiently to disengage the widened bottom portion 56 of the opposite retaining loop portion 54 from beneath the main supporting plate 51. A strip 52 is replaced on the supporting plate 51 by following a reverse procedure.

FIGURE 17 illustrates a typical shifting tool, designated at 71, which may be employed to shift portions of the assembled strips 52 vertically on the supporting plate 51, as viewed in FIGURE 11. The tool 71 comprises a flat rigid body of suitable thin rigid sheet material, such as sheet metal, plastic, or the like, the body having the relatively wide intermediate portion 72 adapted to serve as a gripping means and being formed with a depending end leg 73, 73, spaced to simultaneously engage in a pair of opposite notches 57, 70. With the legs 73, 73 thus engaged and with the upstanding widened handle portion 72 gripped firmly, the adjacent strips may be moved along the supporting plate 51 by exerting appropriate force in the desired direction on the implement 71.

In the various forms of the invention of FIGURES 1 to 8 and FIGURES 11 to 16, the data may be typed on pressure-sensitive tape and the tape may be applied to the strip or plate element 17, 17', 25, 29, and 52, in the same manner as in FIGURES 9 and 10.

While the visible record assemblies above-described are applicable to a wide variety of uses, for example, are of general utility with respect to bookkeeping systems, the described assemblies are particularly useful in connection with preparing master tax roll presentations intended to be reproduced by means of conventional copying machines. Thus, the arrangement illustrated in FIGURE 1 is intended to specifically be used in connection with preparing a master tax roll and is constructed so that it will be conformable with bookkeeping practices in this type of activity.

While certain specific embodiments of an improved visible record supporting panel assembly have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A visible record panel assembly comprising a generally rectangular frame having top and bottom arms and opposite side legs, said side legs being formed with inwardly facing grooves, a plurality of record strip members mounted in said frame, said record strip members having opposite end projections slidably engaged in said grooves, and means detachably connecting the record strips at their adjacent longitudinal margins, said record strips being detachable from each other when clear of the frame, the rear wall of each groove being provided with a plurality of spaced notches, said notches being so located and being of sufficient size to allow clearance for rearward passage of the end projections of an adjacent strip and to allow rearward movement of said strip clear of the frame, whereby the strip may be pushed rearwardly clear of the frame and may be detached.

2. The visible record panel assembly of claim 1, and wherein said connecting means allows relative angling of said record strips.

3. The visible record supporting panel assembly of claim 2, and wherein the strips have overlapping longitudinal marginal portions.

4. The visible record panel assembly of claim 3, and wherein said connecting means comprises interlocking longitudinally-extending hollow projections formed on said overlapping marginal portions.

5. The visible record panel assembly of claim 4, and wherein the record strips have information-bearing surface portions substantially flush with the front walls of the side legs.

6. The visible record panel assembly of claim 5, and wherein the record strips comprise central upstanding longitudinal tongue elements and longitudinal depending wall elements spaced apart to slidably-receive the longitudinal tongue elements of subjacent record strips.

7. The visible record panel assembly of claim 6, and wherein the longitudinal hollow projections comprise outwardly-struck lugs formed respectively on the tongue elements and the rear depending wall elements.

8. The visible record panel assembly of claim 7, and wherein certain of the record strips comprise a plurality of longitudinally-aligned segments having overlapping adjacent end portions and interlocking at said adjacent end portions.

9. A visible record panel assembly comprising a flat generally rectangular supporting body, a plurality of transverse record strip members slidably-mounted on and located closely-adjacent to the plane of said body, and retaining loops on the ends of the record strip members receiving the side margins of the body and detachably slidably-securing the end portions of the strip members to the opposite side marginal portions of the body, and wherein at least one of the retaining loops on each record strip member is detachable, whereby any record strip member may be detached from the assembly without removing the other record strip members.

References Cited

UNITED STATES PATENTS

| | | | |
|---|---|---|---|
| 1,106,843 | 8/1914 | Rand et al. | 40—63 |
| 1,210,670 | 1/1917 | Millard | 40—63 |
| 1,326,694 | 12/1919 | Scheitler | 40—63 |
| 1,358,463 | 11/1920 | Rand | 40—63 |
| 1,514,517 | 11/1924 | Hamilton | 40—63 |
| 1,548,210 | 8/1925 | Russell | 40—63 |
| 1,548,211 | 8/1925 | Russell | 40—63 |

LAWRENCE CHARLES, Primary Examiner